March 8, 1966  W. H. RICHEY  3,238,535
WELDING HELMET
Filed Nov. 4, 1963　　　　　　　　　　　　　　　　3 Sheets-Sheet 1
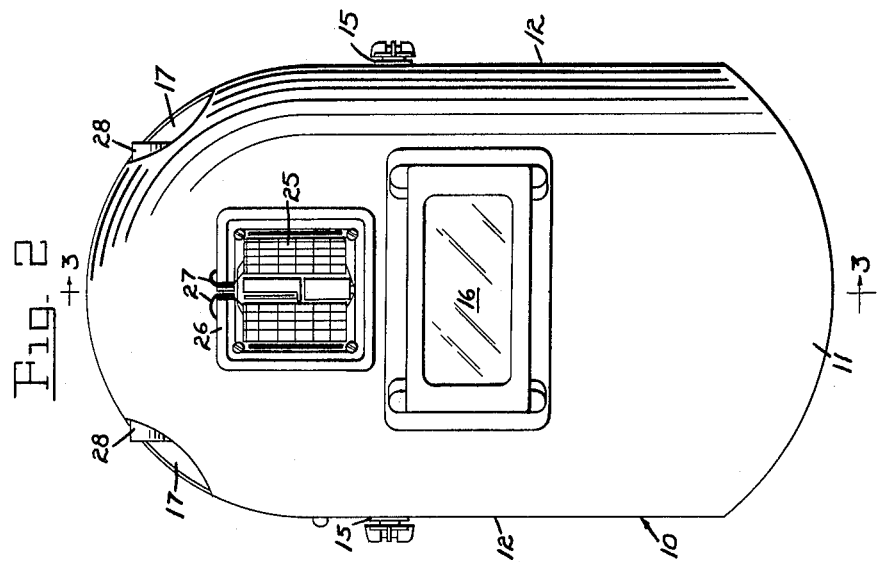
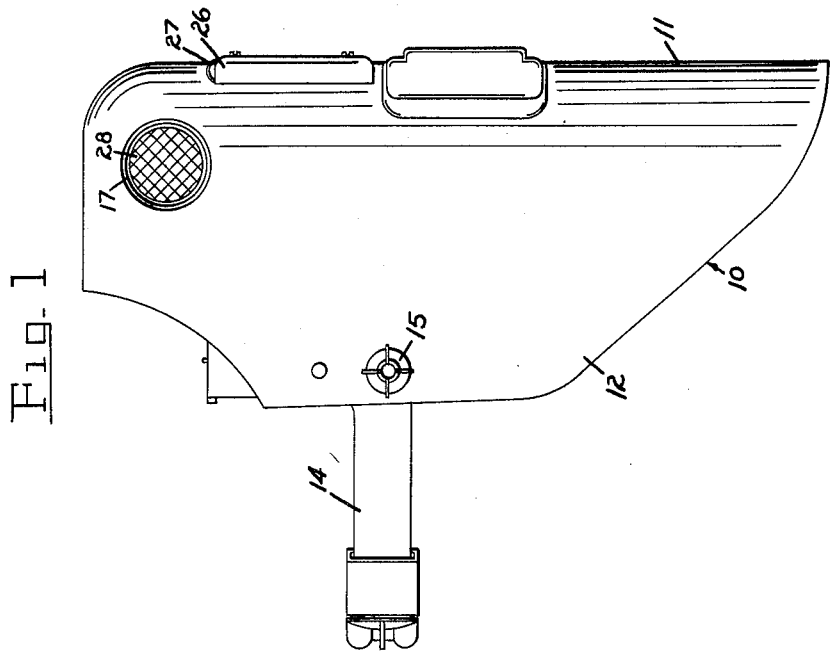
INVENTOR.
WILLIE H. RICHEY
BY *Wells & St. John*
ATTYS.

March 8, 1966  W. H. RICHEY  3,238,535
WELDING HELMET
Filed Nov. 4, 1963  3 Sheets-Sheet 2
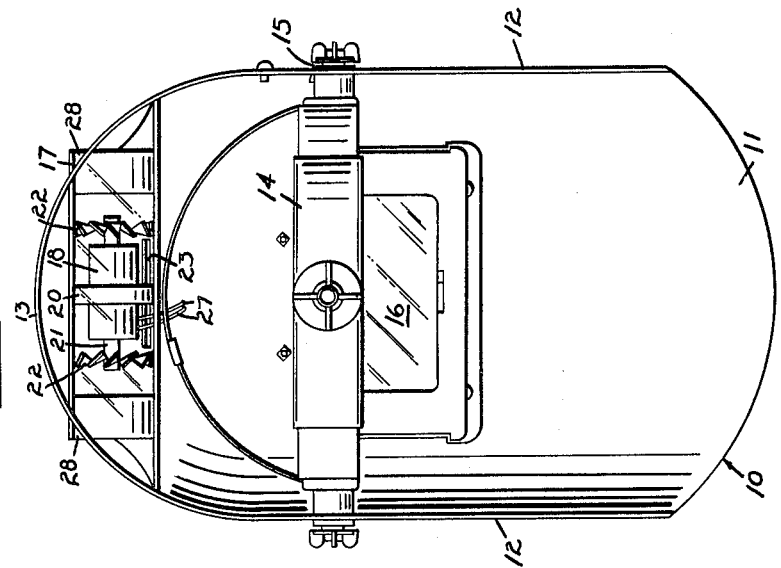
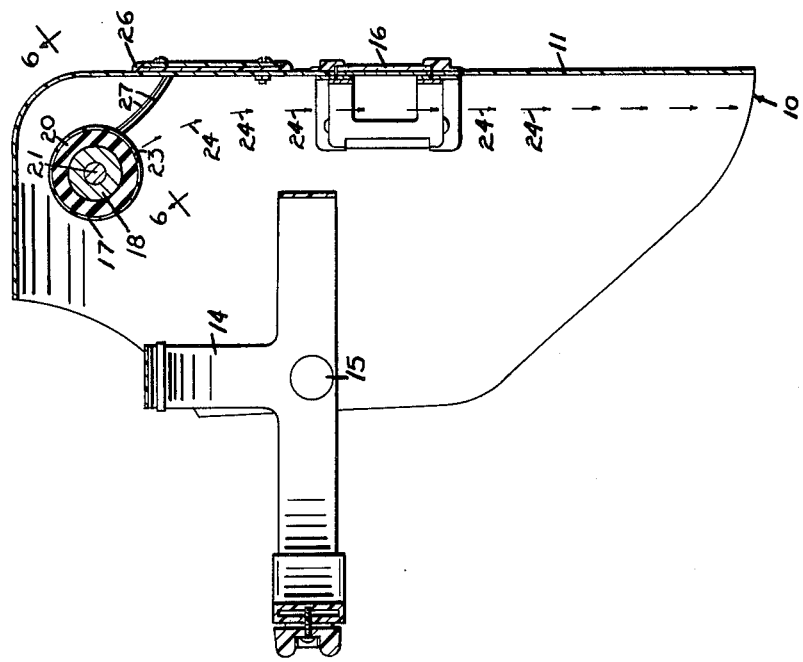
INVENTOR.
WILLIE H. RICHEY
BY
ATTYS.

March 8, 1966  W. H. RICHEY  3,238,535
WELDING HELMET

Filed Nov. 4, 1963  3 Sheets-Sheet 3

INVENTOR.
WILLIE H. RICHEY
BY *Wells & St. John*
ATTYS.

United States Patent Office 3,238,535
Patented Mar. 8, 1966

3,238,535
WELDING HELMET
Willie Hugh Richey, 225 E. Ermina, Spokane, Wash.
Filed Nov. 4, 1963, Ser. No. 321,262
1 Claim. (Cl. 2—8)

This invention relates to a novel welding helmet or hood.

It is common practice for welders to utilize a protective helmet or hood covering their faces during welding operations. A conventional hood wraps about a person's face and covers his neck, and therefore provides a chamber within which gases and foul air can accumulate as they are produced by welding processes. The present invention is concerned with the positive ventilation of such a hood, particularly during its use by one engaged in welding with an electric arc.

It is a first object of this invention to provide a simple modification to a conventional welding hood, enabling the hood to be adequately and effectively ventilated during use of an electric arc welding apparatus by the person wearing the hood.

Another object of this invention is to provide such a device which is activated by the light generated by the arc welding process. Thus it is not necessary for the user to be attached to an outside source of power by cords or cables, nor is it necessary for him to carry batteries that require periodic charging. The most favored source of electric energy for the fan unit utilized in this invention is the solar cell, which generates electrical power due to its activation by incident light of a given intensity.

These and further objects will be evident from a study of the following disclosure, particularly taken in conjunction with the preferred form of the invention which is illustrated in the drawings. It is to be understood that the specific details of this form of the invention are not to limit or control the scope of the concept embodied therein, the definition of the invention being set out in the claim at the end of the specification.

In the drawings:

FIGURE 1 is a side view of a helmet or hood constructed according to the present invention;

FIGURE 2 is a front view of the helmet or hood as seen in FIGURE 1;

FIGURE 3 is a longitudinal sectional view taken along line 3—3 in FIGURE 2;

FIGURE 4 is a rear view of the helmet or hood seen in FIGURE 2;

Figure 5:
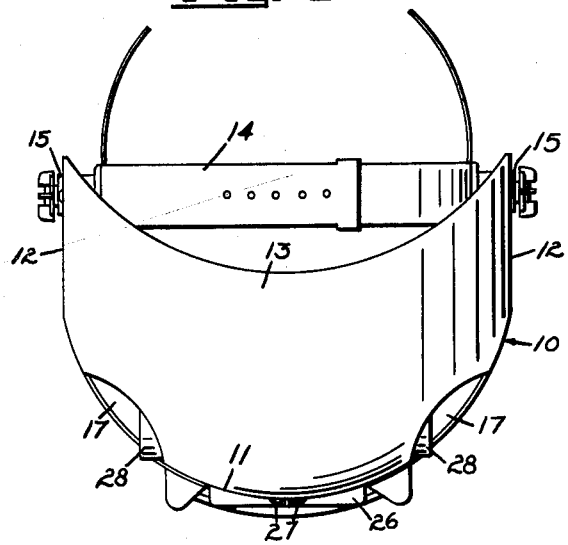
FIGURE 5 is a top view of the helmet or hood seen in FIGURE 1.
Figure 6:
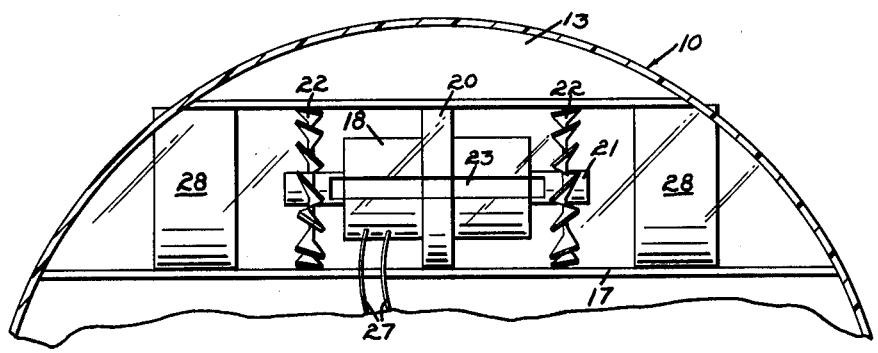
FIGURE 6 is an enlarged fragmentary sectional view taken along line 6—6 in FIGURE 3.

The drawings illustrate a preferred form of the invention, which basically involves the incorporation of an automatic ventilating system within a rather conventional welder's hood. The hood itself comprises a main one piece body 10 having a front surface 11 and integral side surfaces 12 and a top surface 13. The hood shown in the drawings does vary slightly from a conventional hood in that it extends upwardly beyond the usual distance. The hood 10 is designed to protect the face and neck of the person wearing it. A head strap device 14 is pivotally connected to the side surfaces 12 by connectors 15. Thus the helmet can be tilted up over the head of the user when he is not actually welding. A protective eye lens 16 is also provided at the front surface 11 of the hood 10 through which the user of the hood can view his work with safety.

A typical problem of a welder using the hood 10 is the accumulation of gas and smoke in the work area below his face, with the result that this gas and smoke often rises under the hood and is carried to the mouth and nose of the person wearing it. The present invention provides an automatic ventilation apparatus for the hood so as to supply to the user a source of fresh air for breathing purposes. The ventilating system also cleanses the interior of the hood of these noxious gases.

The modification made in the helmet comprises the addition of a cylindrical tube 17 which is shown in the drawings as a clear plastic material. The tube 17 opens through apertures in the sides 12 of the helmet at each axial end of the tube 17. Thus there is unrestricted air passage through the tube 17 itself. At the longitudinal center of tube 17 is mounted an electric motor 18 carried by a central mounting gasket 20. The motor 18 has a central driven shaft 21 on which are fixed two sets of fan blades 22. The blades 22 are mirror images of one another, so that when the shaft 21 is rotated properly the blades 22 will each draw air toward the center of the tube 17.

Along the lower surface of the tube 17, which is fixed to the helmet 10, is a longitudinal apertured slot 23. The slot 23 is directed downwardly along the interior of the front surface above the hood 10. Thus air drawn from the axial ends of tube 17 by motor 18 and fan blades 22 will be forced to exit through the slot 23 downwardly in a general direction illustrated by arrows 24 in FIGURE 3.

In order to operate the motor 18 without the use of rechargeable batteries or an external power source, I have mounted on the front surface 11 of the helmet directly above the lens 16, a series of solar cells 25. The solar cells 25 are conventional light responsive electrical generating devices that produce electrical power when energized by light of a given intensity incident thereon. The cells 25 face outwardly from the helmet in a direction generally perpendicular to the viewing direction of the user through the lens 16.

I have shown two banks of cells 25 in the illustrated example, however, the number of cells 25 will vary, dependent upon the power requirements of the miniature motor 18. The cells 25 must be of sufficient capacity to turn the motor shaft 21 at the desired speed when the cells 25 are energized by the light of an electric arc welding apparatus used at a conventional distance from the hood 10 by the person wearing the hood 10. The number and capacity of cells 25 will thus have to be chosen to meet the normal welding requirements of the user as well as the requirements of the motor 18. This matching of cell power with motor demand should be obvious to anyone skilled in this field. The cells 25 are shown mounted on the helmet 10 within a protective frame 26 from which they can be removed for repair or replacement purposes.

Figure 7:
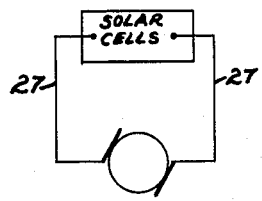
FIGURE 7 is a schematic wiring diagram of the electrical apparatus.

The solar cells 25 are merely wired directly to the input connections for the motor 18, these connections being made by wires 27. The simple wiring connections are illustrated in the schematic diagram of FIGURE 7.

The hood 10 can be manufactured of any desired material, such as a composition structure or a glass fiber reinforced resin laminate. The tube 17 is preferably clear so that one can observe the operative condition of the motor 18, but also could be of any desired opaque material.

Located at the axial inlet ports of the tube 17 are cylindrical filter elements 28. The filter elements 28, when desired, can contain any conventional air filtering medium, such as glass fibers, charcoal, or filter paper layers. The filter elements 28 are preferably slidable in and out of the tube 17 for easy replacement. These filters 28 insure a fresh air supply being drawn by the fan blades 22 and discharged through the slot 23 to thereby provide air to the user of the hood 10. Other types of filters 28 may be necessary in particular instances, and it is to be assumed that equivalent filters can be substituted in this structure.

I have disclosed in the drawings what I believe to be the most preferable structure in utilizing my invention. This is not to preclude other equivalent structure, where the motor 18 might be mounted exteriorly on the hood 10 or the cells 25 might be mounted at a somewhat different location. The basic concept of this invention is an electric generating apparatus designed in a welding hood, and activated by light sensitive generating means, so that the motor 18 will be automatically operated when the user of the hood has struck an arc in a conventional welding process. Since the hood 10 will always be lowered about the user's face when he begins the welding operation, the light from the arc welding process will energize the cells 25 and cause the motor 18 to draw air from both ends of the tube 17 and discharge this air through the central slot 23. The flow of air indicated by arrows 24 in FIGURE 3 will provide fresh air to the user of the hood 10 and will also prevent gases and smoke from entering upwardly from beneath the hood 10. This will insure a steady supply of fresh air to the user at all times when he is welding.

Other equivalent mechanisms can be substituted in the combination without deviating from the basic concept that I have proposed. For this reason only the following claim is intended to limit or restrict the scope of my invention.

Having thus described my invention, I claim:

In a welding hood having a protective front surface including a lens through which the hood user may view his work and rearwardly directed side and top surfaces formed integrally with the front surface, the improvement comprising:

a transversely oriented cylindrical tube mounted across the hood side surfaces at a location adjacent the inner front surface and above the hood lens, said tube having axially open ends open respectively through apertures formed in the hood side surfaces;

an electric motor mounted coaxially within said tube at the longitudinal center thereof, said motor having a driven shaft protruding axially outward at each end thereof;

a pair of complementary fan blade units fixed to the motor shaft at the respective axial ends thereof, said blade units being each adapted to draw air axially toward the tube center when rotated by said motor;

said tube being further provided with a lower aperture formed therethrough at the longitudinal center of the tube and directed downwardly adjacent the inside front surface of said hood;

and light responsive electrical generating means mounted on the exterior of said hood and directed forwardly therefrom, said generating means being wired to said motor so as to operate said motor in response to light incident thereon.

References Cited by the Examiner
UNITED STATES PATENTS

| | | | |
|---|---|---|---|
| 735,790 | 8/1903 | Meerza | 2—171.3 |
| 737,373 | 8/1903 | Eagle et al. | 2—5 |
| 2,402,820 | 6/1946 | Kitchen | 2—8 |
| 2,423,320 | 7/1947 | Hurley | 2—8 |
| 2,514,990 | 7/1950 | Dewan | 2—8 |

JORDAN FRANKLIN, *Primary Examiner.*